INVENTOR.
Ernest C. Angelini
BY
Hofgren, Wegner, Allen, Stellman & McCord
Att'ys Aug. 16, 1966     E. C. ANGELINI     3,266,392

ROAD STRIPING APPARATUS

Filed June 14, 1963     2 Sheets-Sheet 2

United States Patent Office 3,266,392
Patented August 16, 1966

3,266,392
ROAD STRIPING APPARATUS
Ernest C. Angelini, Steger, Ill., assignor to Perma-Line Manufacturing Corporation of America, a corporation of Illinois
Filed June 14, 1963, Ser. No. 288,009
4 Claims. (Cl. 94—44)

This invention relates to road striping apparatus and more particularly to such apparatus which is a self-contained, portable unit for quickly and continuously heating thermoplastic material to be applied and enabling an operator to apply road stripes more efficiently.

At the present time, equipment for applying thermoplastic material to roads for striping is known, such as shown in Lipkins Patent No. 3,070,822. In such previously known apparatus, it has not been possible to easily maintain the apparatus in operating condition, due to the changes in the temperatures of the material to be applied and the inability to properly maintain temperature. The maintaining of the proper temperature for the thermoplastic material is necessary in order to make certain that this material properly bonds to the road surfacing material. Frequently, such an apparatus is used to apply reflecting material, such as glass beads, to the thermoplastic material that has been applied and there has been no certainty that the beads would be properly dispensed as required.

An object of this invention is to provide new and improved road striping apparatus.

A further object of the invention is to provide road striping apparatus for applying both thermoplastic material and reflecting material in the form of glass beads onto said thermoplastic material, in which the operating mechanism for the striping die which applies the thermoplastic material and the driven roller of the bead dispenser are interlocked to make certain that the bead dispenser operates when the striping die is operable and with the mechanism constructed to permit shut off of the striping die ahead of the bead dispenser whereby reflecting material can be deposited along the entire length of thermoplastic material.

Further objects and advantages will become apparent from the following detailed description taken in connection with the accompanying drawings in which.

Figure 1:
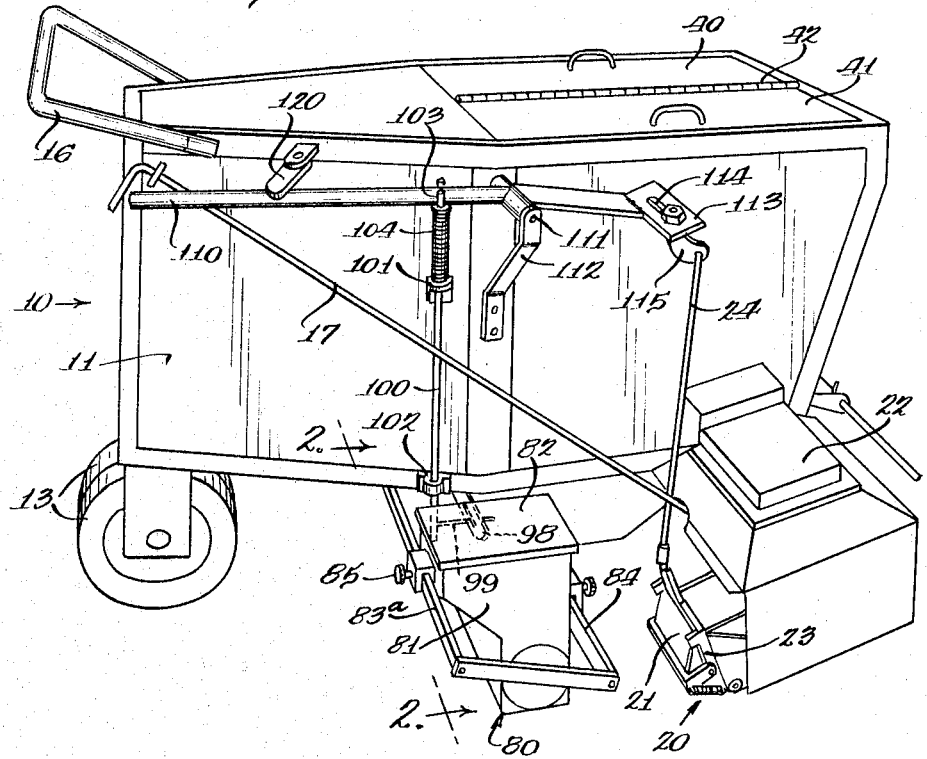
FIG. 1 is a perspective view of the road striping apparatus looking toward the right-hand side thereof.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 3:
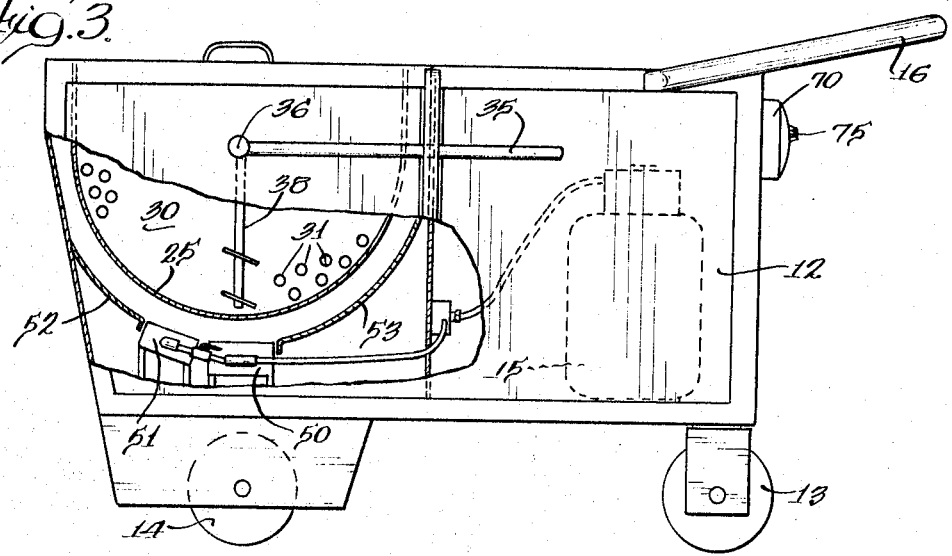
FIG. 3 is a side elevational view, with parts broken away, and taken at the side opposite from that shown in FIG. 1.

The road striping apparatus is shown generally in FIGS. 1 and 3 in which a frame, indicated generally at 10, has end walls and also a side wall 11, shown in FIG. 1, and a side wall 12, shown in FIG. 3. The frame is supported relative to the ground by a plurality of ground-engaging wheels with a pair of adjacent wheels 13 being located at the rear of the frame and spaced apart front wheels 14.

Figure 4:
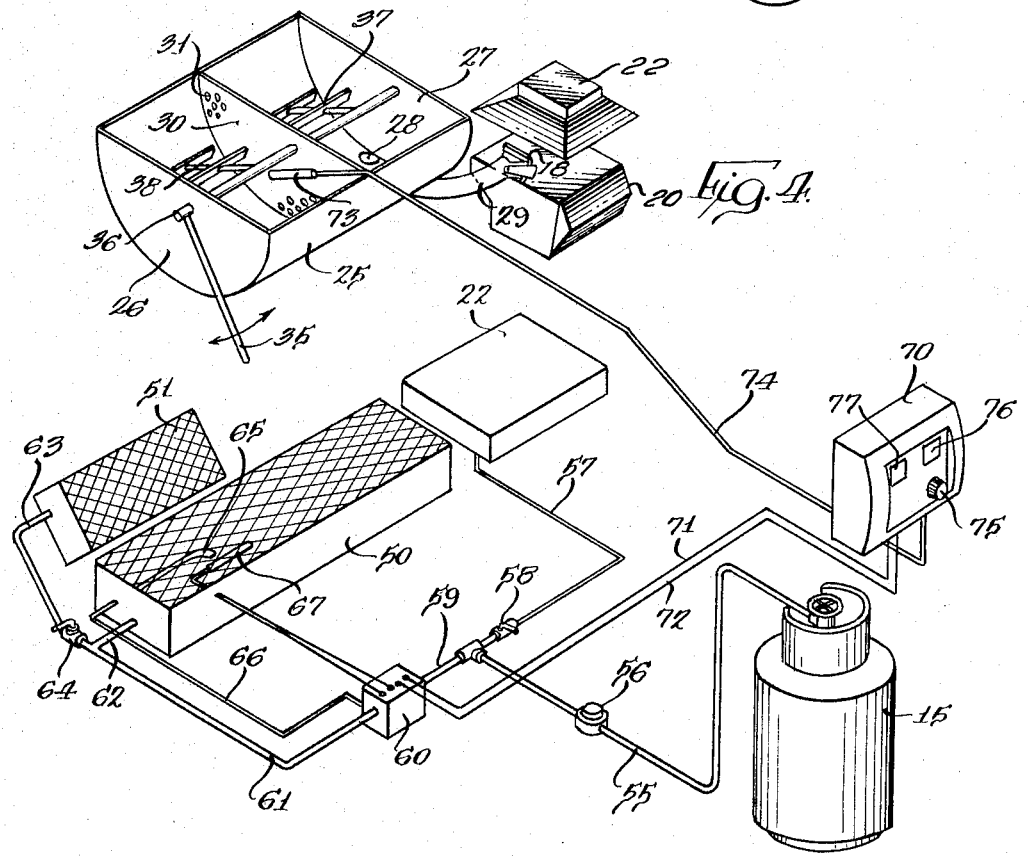
FIG. 4 is a schematic view of the burner and fuel system and also further showing the reservoir construction.

The apparatus is entirely self-contained and includes an interior chamber at the rear thereof for holding a tank 15 of LP gas for supplying various burners associated with the apparatus, as shown in FIGS. 3 and 4.

A handle member 16 secured to the frame and extending rearwardly of the apparatus is positioned for engagement by an operator to move the unit along a roadway.

The apparatus is constructed to utilize thermoplastic material which is supplied in a solid state and which is suitably heated to a temperature of approximately 400° F. prior to application onto a roadway. The material is applied to the roadway to form a stripe by a striping die indicated generally at 20, which is of the same construction as that shown in Lipkins Patent No. 3,070,822, and reference may be had thereto for more details concerning this striping die. The striping die carries a quantity of fluid thermoplastic material with a valve plate 21 being positionable to open the striping die and permit thermoplastic material to move from the die onto the roadway. The striping die also moves up and down relative to the road between an operating position and a raised inoperative position. This thermoplastic material is kept at the desired temperature by a radiant gas burner 22, located over the striping die, and which functions to supply heat to the pool of material in the striping die and keep it at the proper temperature.

The striping die 20 is positionable in the lower operating position with the valve plate 21 open or in an elevated position away from the road as described in the Lipkins patent, with these positions being determined by a linkage including a link rod 24 which connects to a lever arm 23 of the striping die.

A reservoir for initially heating the material to be applied and supplying it to the striping die 20 is located within the frame 10 and is shown more particularly in FIGS. 3 and 4. This reservoir has a curved plate 25 defining a bottom of the reservoir and end walls 26 and 27. An outlet opening 28 in the bottom and at one end of the reservoir connects with a pipe 29 leading to the shut off valve 18 which is positioned directly over the striping die 20 and under the burner 22. This shut off valve is more particularly described in the referred to Lipkin's patent and is operated by a manually operable control rod 17 which extends from the shut off valve to the rear of the unit where it is positioned for rotation by an operator to either have the shut off valve open or closed.

With maintenance of proper temperature of the plastic material being required, the reservoir is specially constructed to avoid any radical change in temperature during operation. As a road stripe is applied, material is flowing out through the reservoir outlet 28 and it is necessary to occasionally add additional cold solid material to the reservoir. In order to avoid substantially reducing the temperature of the liquid material, a divider is provided in the reservoir to prevent the cold material affecting the temperature of all the material in the reservoir. This divider is in the form of a plate 30 extending from the bottom to the top of the reservoir and having a plurality of perforations 31 therein. In this manner, solid, cold material can be added to the part of the reservoir remote from the outlet 28 and, as this material becomes fluid and reaches the proper temperature, the material flows through the perforations 31 to the side of the reservoir having the outlet. Thus, additional material can be added during operation, without reducing the temperature of the entire batch of material in the reservoir. There is always a supply of material at the proper temperature in the part of the reservoir communicating with the outlet and the shut off valve 18.

For stirring of the material, a handle 35 is mounted adjacent the side 12 of the apparatus and connects to a shaft 36 extending through the reservoir and rotatably mounted therein and having a pair of arms 37 and 38 with fingers thereon which extend down into the batch of plastic material, whereby manual rocking of the handle 35 will stir the material in the reservoir.

In order to close off the reservoir and retain heat and also to permit access thereto, the top of the unit has a pair of doors 40 and 41 which are hinged together by a hinge pin connected to the frame with the hinge pin being indicated generally at 42 and overlying the dividing plate 30 in the reservoir. Thus, when the door 40 is opened, the cold material can only be added to the proper side of the reservoir.

The system for supplying heat to material in the reservoir quickly heats an initial batch of material and provides a greater amount of heat to the side of the reservoir which receives cold material during operation.

A main radiant gas burner extends underneath the reservoir for the entire length thereof. This main burner is indicated at 50. Additionally, an auxiliay burner 51 of a shorter length is located to the front of the main burner and beneath the side of the reservoir to which the cold material is added during operation. These burners open to a space beneath the reservoir bottom wall 25 and additional heating efficiency is obtained by the use of a pair of heat deflecting plates 52 and 53 which are curved similarly to the reservoir bottom wall and function to define a heating chamber beneath the reservoir.

The burner 22 for the striping die, as well as the main burner 50 and auxiliary burner 51, are supplied with tank gas from the tank 15 through a line 55 having a pressure regulator 56. A branch line 57 with a shut off valve 58 supplies gas directly to the radiant burner 22 and a branch line 59 connects to a pilot valve 60 of the type manufactured by Minneapolis-Honeywell. A line 61 from the outlet side of the pilot valve extends to a pair of branch lines 62 and 63 which supply the main burner 50 and the auxiliary burner 51, with there being a manually operable shut off valve 64 for the auxiliary burner 51. With this shut off valve 64, it is possible to not use the auxiliary burner, such as when the apparatus is receiving preheated plastic material from a master tank located at the site where the stripe is being applied. The burners are pilot-operated, with there being a pilot burner 65 supplied through a line 66 from the pilot valve and a thermopile 67 connected by a suitable line to the pilot valve 60.

A temperature control unit 70 is located at the rear wall of the frame and is connected by suitable lines 71 and 72 to the pilot valve 60 and has a thermocouple 73 located within the reservoir and connected to the control unit by a line 74 whereby the burners are operated to maintain the desired temperature of the fluid plastic material in the reservoir. This desired temperature, with the particular material used, is approximately 400° F. and this temperature can be set by operating the control knob 75 with there being one window 76 to read the temperature set by operation of the knob and another window 77 to read the actual temperature sensed by the thermocouple 73.

Figure 2:
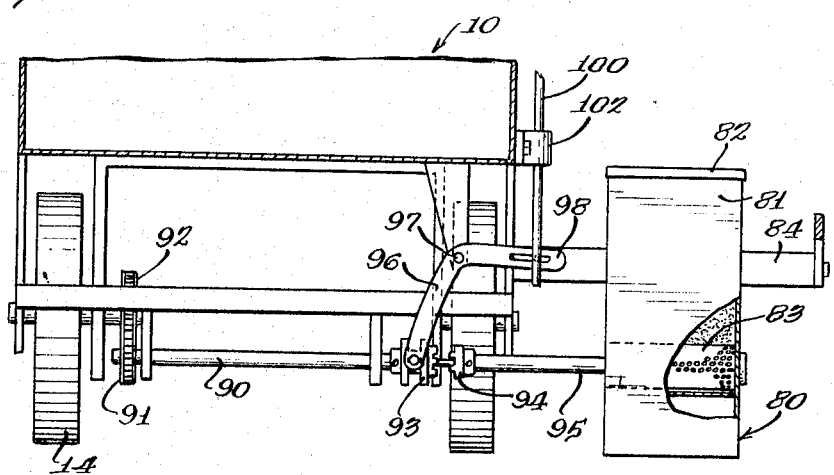
FIG. 2 is a fragmentary vertical section on an enlarged scale taken generally along the line 2—2 in FIG. 1.

The apparatus also includes mechanism for dispensing reflective material onto the applied strip of thermoplastic material. This dispenser is indicated generally at 80 and embodies a cabinet 81 with a removable top cover 82 for access to the interior for filling the dispenser with reflective material, such as blass beads. This dispenser is generally of the type shown in the Lipkin's patent. There are interior plates defining a throat with a selectively driven dispensing roller 83 positionable in the throat for dispensing beads as the roller is rotated. As shown in FIG. 2, this roller is provided with dimples on the surface thereof defining small pockets for receiving beads and thus as the roller is rotated a measured quantity of beads is dispensed. The dimples extend for the entire length of the roller, so that beads are dispensed across the entire width of the dispenser.

The dispenser cabinet 81 is mounted on the frame by being positioned on a pair of guide bars 83a and 84 secured to and extending outwardly from the frame, with brackets and tightening screws, such as indicated at 85, secured to the dispenser cabinet for holding the cabinet in adjusted position.

The dispensing roller 83 is driven by means of a selectively operable clutch. This mechanism comprises a rotatably mounted shaft 90 supported at the bottom of the frame and driven by a chain 91 engaging a drive sprocket 92 upon the axil (not shown) of the front wheels 14. The shaft 90 has a drive clutch section 93 splined thereto and movable to a position to engage a driven clutch section 94 secured to a shaft 95 connected to the dispensing roller 83. As shown in FIG. 2, the clutch is disengaged and shifting of the drive clutch segment 93 toward the right makes the drive to the roller 83 so that the roller 83 rotates when the apparatus is moved along a road.

A linkage is provided for engaging and disengaging the clutch in the form of a bell crank 96 pivoted at 97 to the frame and extending outwardly through an opening in the frame where an end 98 of the bell crank receives within a slot formed therein a pin 99 at the lower end of a vertically extending rod 100. The rod 100 is movably mounted relative to the frame by a pair of brackets 101 and 102, having central openings through which the rod extends. The upper end 103 of the rod is forked for a purpose subsequently to be described and a spring 104 acts between the upper end of the rod and the bracket 101 to yieldably urge the rod 100 to an upper position in which the drive clutch for the dispensing roller 83 is engaged.

The bead dispenser 80 is located behind the striping die 20 an actual distance of approximately ten inches. In operation, it is desirable that the bead dispenser begin to function at the same time as the striping die, as otherwise an operator might forget to start the bead dispenser in operation. In order to accomplish this, the operation of both units is under the control of handle 110 pivoted to the frame by a pivot pin 111 secured to the frame with the pin supported at its outboard end by a frame-attached bracket 112. This handle 110, at its opposite end, carries a plate 113 having a slot 114 in which an arm 115 can be adjustably secured, with the arm 115 connecting to the rod 24 which extends to the striping die. The handle 110 has three positions and in the lower position shown in FIG. 1 the striping die is in an elevated, inoperative position and the rod 100 is depressed to disengage the clutch elements 93 and 94 for the bead dispenser. This position is maintained by a swingable latch plate 120 on the frame. When operation is desired, the plate 120 is pivoted out of the way and the handle 110 can be raised to an uppermost position in which the striping die rod 24 has been lowered to lower the striping die to the road level and open the valve plate 21. The striping die when in lowered position holds the handle in the uppermost position as described in the Lipkins patent. Additionally, the handle has been raised from engagement with the forked end 103 of the dispenser actuating rod 100 so that the spring 104 may expand to elevate the rod 100 and, as a result, engage the clutch elements 93 and 94.

When nearing the end of a line, it is desirable to shut off the striping die and continue to dispense beads. Therefore, the handle 110 has an intermediate position, manually maintained, in which the striping die 20 is turned off and the rod 100 has still not been engaged by the handle whereby additional beads are dispensed. At the end of the line, the handle may then be depressed further to the position shown in FIG. 1 to additionally shut off the bead dispenser.

In view of the foregoing description, it will be seen that a more efficient and simply operated unit has been provided in which the plastic material is retained at the desired temperature automatically and little variation in temperature thereof results from the addition of cold material due to the dividing wall in the reservoir. The operation is further simplified by having the striping die and bead dispenser interlocked in their operation, so that beads must be dispensed when the striping die is opened when the bead dispenser is in use and the striping die can be turned off in advance of the bead dispenser.

I claim:

1. In a road striping apparatus, a frame, a plurality of ground-engaging wheels on said frame for movably supporting the frame, a striping die mounted on said frame for applying material to the road, a glass bead dispenser mounted on said frame rearwardly of said striping die and including a driven roller for dispensing beads onto said applied material, selectively operable clutch means driven by said wheels for driving said dispensing roller, a first linkage for opening and closing said die, a second linkage for engaging and disengaging said clutch, a handle pivotally connected to said frame, means operatively connecting said first linkage to the handle for movement therewith and in an opposite direction whereby as the handle moves up the first linkage moves down, said second linkage having a rod extending towards said handle, means urging said rod towards said handle to engage said clutch when said rod is extended, said handle being out of contact with said second rod when raised to its extreme position for opening said striping die, lowering of said handle first closing the striping die and then engaging and depressing said second rod to disengage said clutch.

2. An apparatus as defined in claim 1 in which said bead dispensing roller is formed with dimples to dispense measured quantities of beads.

3. In a road striping apparatus, a frame, a plurality of ground-engaging wheels on said frame for movably supporting the frame, a striping die mounted on said frame for applying material to the road, a glass bead dispenser mounted on said frame rearwardly of said striping die and including a driven roller for dispensing beads onto said applied material, selectively operable clutch means driven by said wheels for driving said dispensing roller, a first linkage for opening and closing said die, a second linkage for engaging and disengaging said clutch including a rod with a forked end and spring means urging the rod to a clutch disengaged position, and a pivotally mounted handle operatively connected to said first linkage to have the first linkage move in a direction opposite to handle movement and overlying said rod forked end, said handle having three positions with a first position engaging and depressing said rod and elevating said first linkage to its highest position to render said bead dispenser and striping die inoperative, a second position out of engagement with said rod and fully elevated to place said first linkage at its lowest position to render both the bead dispenser and striping die operative and a third intermediate position out of engagement with the rod to place said first linkage at an intermediate position with the die inoperative and the bead dispenser still operative.

4. In a road striping apparatus as defined in claim 3 and including a latch member, means pivotally mounting the latch member on the frame for movement to a position to overlie said handle and hold the handle in said first position against the action of said spring means.

References Cited by the Examiner
UNITED STATES PATENTS

| | | | |
|---|---|---|---|
| 1,574,489 | 2/1926 | Kittel | 126—343.5 |
| 2,041,359 | 5/1936 | Littleford | 126—343.5 |
| 2,076,370 | 4/1937 | Hollingshead | 94—44 |
| 2,278,948 | 4/1942 | Rodli | 94—44 |
| 2,956,486 | 10/1960 | Siegle | 94—44 |
| 3,018,704 | 1/1962 | Searight | 94—44 |
| 3,070,822 | 1/1963 | Lipkins | 94—44 X |

JACOB L. NACKENOFF, *Primary Examiner.*